(12) United States Patent
Kuester et al.

(10) Patent No.: US 10,207,647 B2
(45) Date of Patent: *Feb. 19, 2019

(54) FULL DISPLAY MIRROR WITH GEAR-DRIVEN TOGGLE MECHANISM

(71) Applicant: Gentex Corporation, Zeeland, MI (US)

(72) Inventors: Ulrich A. Kuester, Spring Lake, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,802

(22) Filed: May 7, 2018

(65) Prior Publication Data
US 2018/0272949 A1  Sep. 27, 2018

Related U.S. Application Data

(63) Continuation of application No. 15/053,252, filed on Feb. 25, 2016, now Pat. No. 9,963,074.

(60) Provisional application No. 62/121,960, filed on Feb. 27, 2015.

(51) Int. Cl.
| | | |
|---|---|---|
| *G02B 27/01* | (2006.01) | |
| *B60R 1/12* | (2006.01) | |
| *H04N 7/18* | (2006.01) | |
| *B60R 1/04* | (2006.01) | |

(52) U.S. Cl.
CPC ............... *B60R 1/12* (2013.01); *B60R 1/04* (2013.01); *G02B 27/0101* (2013.01); *H04N 7/183* (2013.01); *B60R 2001/1215* (2013.01); *B60R 2001/1253* (2013.01); *B60R 2300/205* (2013.01); *B60R 2300/8026* (2013.01)

(58) Field of Classification Search
None
See application file for complete search history.

(56) References Cited

U.S. PATENT DOCUMENTS

| 3,421,728 A | * | 1/1969 | Norman | .................... B60R 1/04 248/477 |
| 4,895,337 A | * | 1/1990 | Oskam | ...................... B60R 1/04 248/487 |
| 6,520,667 B1 | | 2/2003 | Mousseau | |
| 6,648,477 B2 | | 11/2003 | Hutzel et al. | |

(Continued)

*Primary Examiner* — Anand S Rao
*Assistant Examiner* — Tyler B Edwards
(74) *Attorney, Agent, or Firm* — Price Heneveld LLP; Bradley D. Johnson

(57) ABSTRACT

A rearview mirror for a vehicle includes a housing defining an interior cavity and an open side, a substrate coupled within the open side of the housing and having a reflective surface thereon, and an actuation mechanism coupled within the housing. The actuation mechanism includes a mounting plate rotatably coupled within the cavity of the housing at a first end thereof and a spring plate coupled with the mounting plate and having a resiliently deformable arm portion extending away from the mounting plate. The actuation mechanism also includes a socket body rotatably coupled within the interior cavity of the housing, the arm portion of the spring plate being operably coupled with the socket body along a coupling axis and a motor rigidly coupled within the interior cavity of the housing and operably coupled with the socket body to drive rotation thereof.

20 Claims, 5 Drawing Sheets

(56) References Cited

U.S. PATENT DOCUMENTS

| | | | |
|---|---|---|---|
| 7,722,199 B2* | 5/2010 | DeWard | B60R 1/04 |
| | | | 248/481 |
| 9,963,074 B2* | 5/2018 | Kuester | B60R 1/04 |
| 2005/0068647 A1* | 3/2005 | Brandt | B60R 1/081 |
| | | | 359/877 |
| 2008/0055757 A1 | 3/2008 | Uken et al. | |
| 2011/0176323 A1 | 7/2011 | Skiver et al. | |
| 2013/0279014 A1 | 10/2013 | Fish, Jr. et al. | |
| 2014/0347488 A1 | 11/2014 | Tazaki et al. | |

* cited by examiner

FULL DISPLAY MIRROR WITH GEAR-DRIVEN TOGGLE MECHANISM

CROSS REFERENCE TO RELATED APPLICATION

This application is a continuation of and claim priority to U.S. patent application Ser. No. 15/053,252 (now U.S. Pat. No. 9,963,074) filed on Feb. 25, 2016, entitled "FULL DISPLAY MIRROR WITH GEAR-DRIVEN TOGGLE MECHANISM," which claims priority under 35 U.S.C. § 119(e) to U.S. Provisional Patent Application No. 62/121,960, filed on Feb. 27, 2015, entitled "FULL DISPLAY MIRROR WITH GEAR-DRIVEN TOGGLE MECHANISM," the disclosure of which is hereby incorporated herein by reference in its entirety.

TECHNOLOGICAL FIELD

The present disclosure relates generally to a full-display rearview mirror for a motor vehicle and, more particularly, relates to a mechanism for automatic movement of the display mirror substrate between active and inactive positions.

BACKGROUND

Automotive rearview mirrors including video displays therein may be referred to as full-display mirrors. Such mirrors may also include functionality as an ordinary, reflective rearview mirror that can be implemented as an alternative to the included video display, which can be done, for example, in response to a loss of power to the video display or the like. Incorporation of such functionality has been accomplished by including a reflective surface over the video display that is at least partially transparent such that the display is visible therethrough. To prevent the reflected image from interfering with the video image, when available, the mirror may be tilted upward, toward the vehicle headliner, such that the reflective image is less noticeable to the driver and. Such tilting has been implemented, for example, by use of a bi-modal lever that the driver can use to manually move the mirror between the upwardly-tilted position associated with video display use and a position whereby the reflective surface can be used in connection with the rearview mirror. Such mechanisms may currently operate by manual input by the user and may give an undesirable appearance of an ordinary prism-mirror. Accordingly, further advances may be desired.

SUMMARY

According to one aspect of the present disclosure, a rearview mirror for a vehicle includes a housing defining an interior cavity and an open side, a substrate coupled within the open side of the housing and having a reflective surface thereon, and an actuation mechanism coupled within the housing. The actuation mechanism includes a mounting plate rotatably coupled within the cavity of the housing at a first end thereof and a spring plate coupled with the mounting plate and having a resiliently deformable arm portion extending away from the mounting plate. The actuation mechanism also includes a socket body rotatably coupled within the interior cavity of the housing, the arm portion of the spring plate being operably coupled with the socket body along a coupling axis and a motor rigidly coupled within the interior cavity of the housing and operably coupled with the socket body to drive rotation thereof.

According to another aspect of the present disclosure, a rear-vision system for a vehicle includes a video camera mounted on the vehicle in a position to capture an image of a portion of an exterior thereof and a display mirror. The display mirror includes a housing defining an interior cavity and an open side, a substrate coupled over the open side of the housing and having a display in electronic communication with the camera for presenting the image thereon and a one-way reflective layer overlying the display, and an actuation mechanism coupled within the housing. The actuation mechanism has a mounting plate rotatably coupled within the cavity of the housing at a first end thereof, a spring plate coupled with the mounting plate and having a resiliently deformable arm portion extending away from the mounting plate, and a socket body rotatably coupled within the interior cavity of the housing, the arm portion of the spring plate being operably coupled with the socket body along a coupling axis. A motor is rigidly coupled within the interior cavity of the housing is operably coupled with the socket body to drive rotation thereof.

According to another aspect of the present disclosure, a vehicle includes a windshield, a headliner adjacent an upper edge of the windshield, and a mirror assembly. The mirror assembly includes a substrate including a display and a one-way reflective layer overlying the display, a mounting plate rotatably coupled within the cavity of the housing at a first end thereof, a spring plate coupled with the mounting plate and having a resiliently deformable arm portion extending away from the mounting plate, and a socket body rotatably coupled within the interior cavity of the housing, the arm portion of the spring plate being operably coupled with the socket body along a coupling axis. A motor is rigidly coupled within the interior cavity of the housing and operably coupled with the socket body to drive rotation thereof.

These and other features, advantages, and objects of the present device will be further understood and appreciated by those skilled in the art upon studying the following specification, claims, and appended drawings.

DETAILED DESCRIPTION OF EMBODIMENTS

Figure 1:
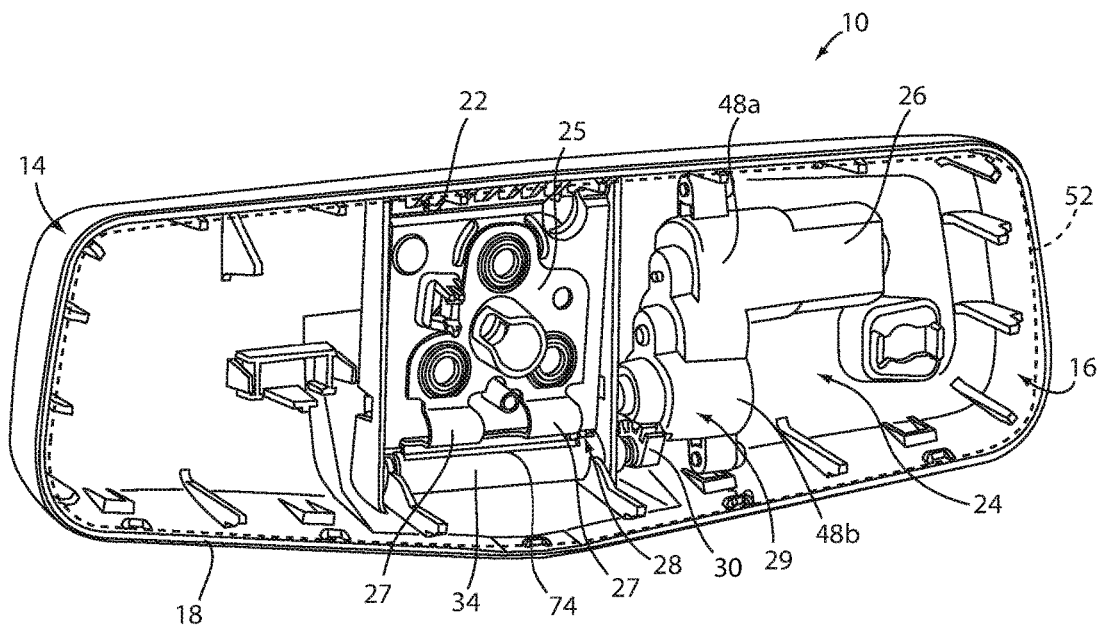
FIG. 1 is a front perspective view of a portion of a rearview mirror according to an aspect of the disclosure and including an actuation mechanism for tilting a display substrate included therewith.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
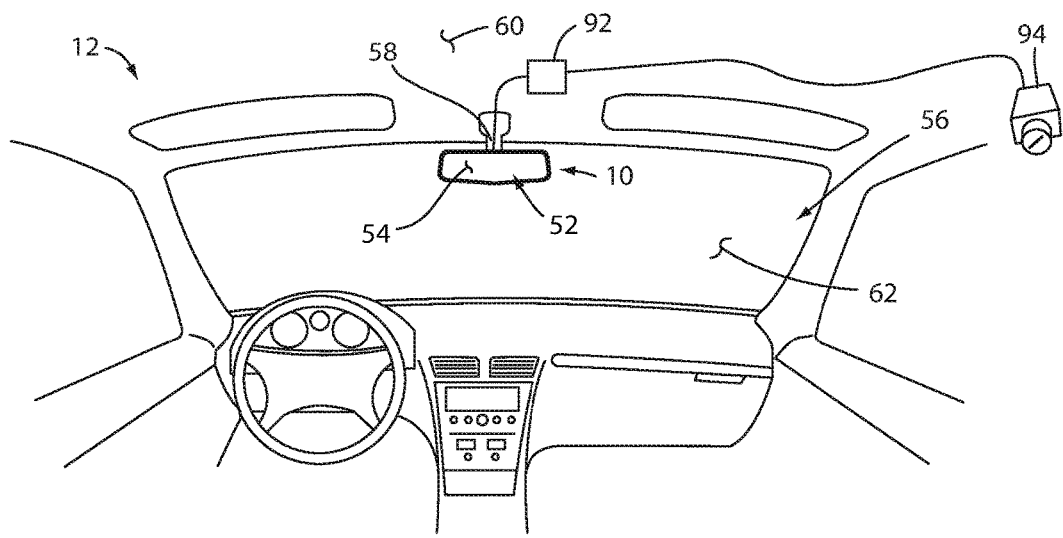
FIG. 2 is a perspective view of a portion of a vehicle interior including the rearview mirror of FIG. 1.

Referring now to FIG. 1, reference numeral 10 generally designates a rearview mirror for a vehicle 12 (of which the interior thereof is shown in FIG. 2). Rearview mirror 10 includes a housing 14 defining an interior cavity 16 and an open side 18 to the cavity 16. The rearview mirror 10 further includes an actuation mechanism 24 within the housing 14 and having a mounting plate 20 rotatably coupled within the cavity 16 of the housing 14 at a first end 22 of the mounting plate 20. The actuation mechanism 24 further has a spring plate 25 coupled with the mounting plate 20 and with a resiliently deformable spring arm 27 extending therefrom. A socket body 34 is rotatably coupled within the interior cavity 16 of the housing 14, the spring arm 27 portion of the spring plate 25 being operably coupled with the socket body 34. A motor 26 is coupled within the interior cavity 16 of the housing 14 and is operably coupled with the socket body 34 to drive rotation thereof.

As shown in the Figures, motor 26 is operable to drive movement of mounting plate 20 relative to housing 14, with which motor 26 is rigidly coupled, by rotation of socket body 34 between opposing, stable positions provided by spring plate 25 (and in particular spring arms 27) in the operable engagement thereof with socket body 34. To overcome the force of spring arms 27 that provides the stable positions of socket body 34 and, accordingly, of mounting plate 20, motor 26 may connect with socket body 34 by a reduction mechanism 29 coupled between an output gear 42 coupled with output shaft 32 of motor 26 and a spur gear 30 that is coupled with socket body 34.

As shown in FIG. 2, rearview mirror 10 can be used in connection with a vehicle interior 56. In one embodiment substrate 52 can include a video display along a portion or an entirety thereof such that rearview mirror is what may be referred to as a full-display mirror. A substrate 52 including such a display is referred to herein as "display substrate 52" and may be capable of displaying an image replicating that which would be available from a typical reflective mirror (which may be captured by an appropriately-positioned video camera, such as camera 94, or the like) when the display is in an active state. Such an image can be supplemented with other information presented on display substrate 52. In combination with such a display substrate 52, reflective surface 54 may be applied so as to overlie the display as a coating or separate element having properties to both provide a reflected image as well as to permit a video image of display substrate 52 to be visible therethrough in what may be referred to as a rear vision system.

The presence of reflective surface 54 permits substrate 52 to be used as a standard rearview mirror (i.e. without the need to view the displayed image) when the display is inactive, which may occur when the related vehicle 12 is not running or when power to the display substrate 52 is interrupted, for example. When in the active state, however, the presence of the reflective surface 54 over display substrate 52 can cause the image reflected by reflective surface 54 to compete with an image presented on display substrate 52. To alleviate such image competition, substrate 52 can be positioned such that reflective surface 54 reflects an image of the headliner 60 toward the driver. Because vehicle headliners are of generally consistent, non-reflective material, such an image may compete less with the video image of display substrate 52.

Rearview mirror 10, by way of the actuation mechanism 24, including mounting plate 20, spring plate 25, socket body 34, motor 26, and reduction mechanism 29 can provide for automatic repositioning of the remainder of mirror 10 (i.e., housing 14 and display substrate 52) between an appropriate position thereof for use of reflective surface 54 when display substrate 52 is in the inactive state and for viewing of a displayed image, without undesirable competition, when display substrate 52 is in the active state.

Figure 3:
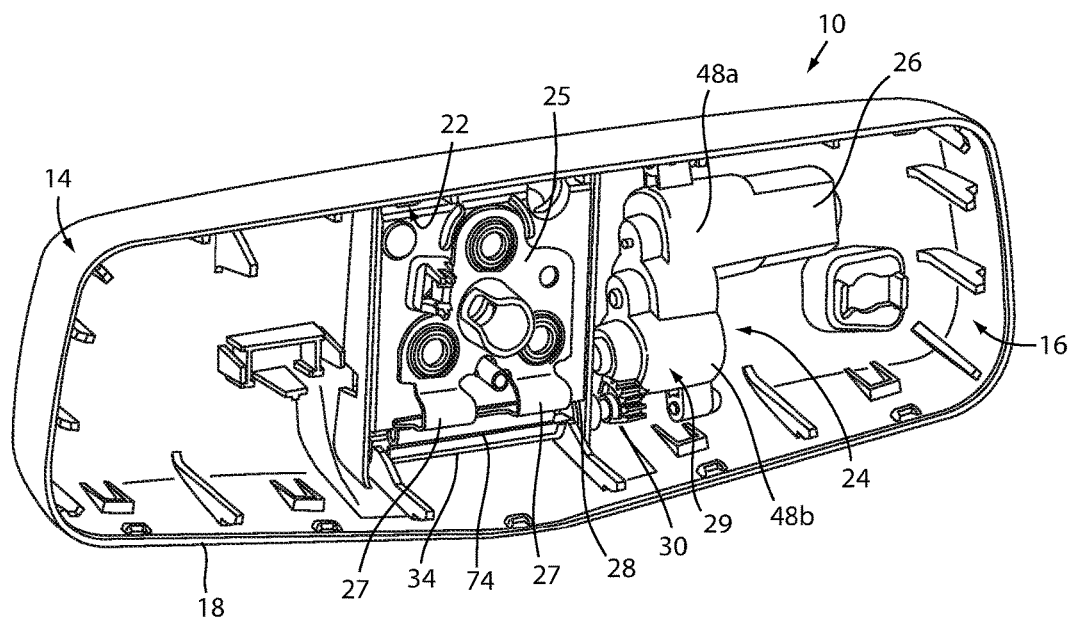
FIG. 3 is a front perspective view of the rearview mirror portion of FIG. 1 with the actuation mechanism in an additional configuration provided thereby.
Figure 4:
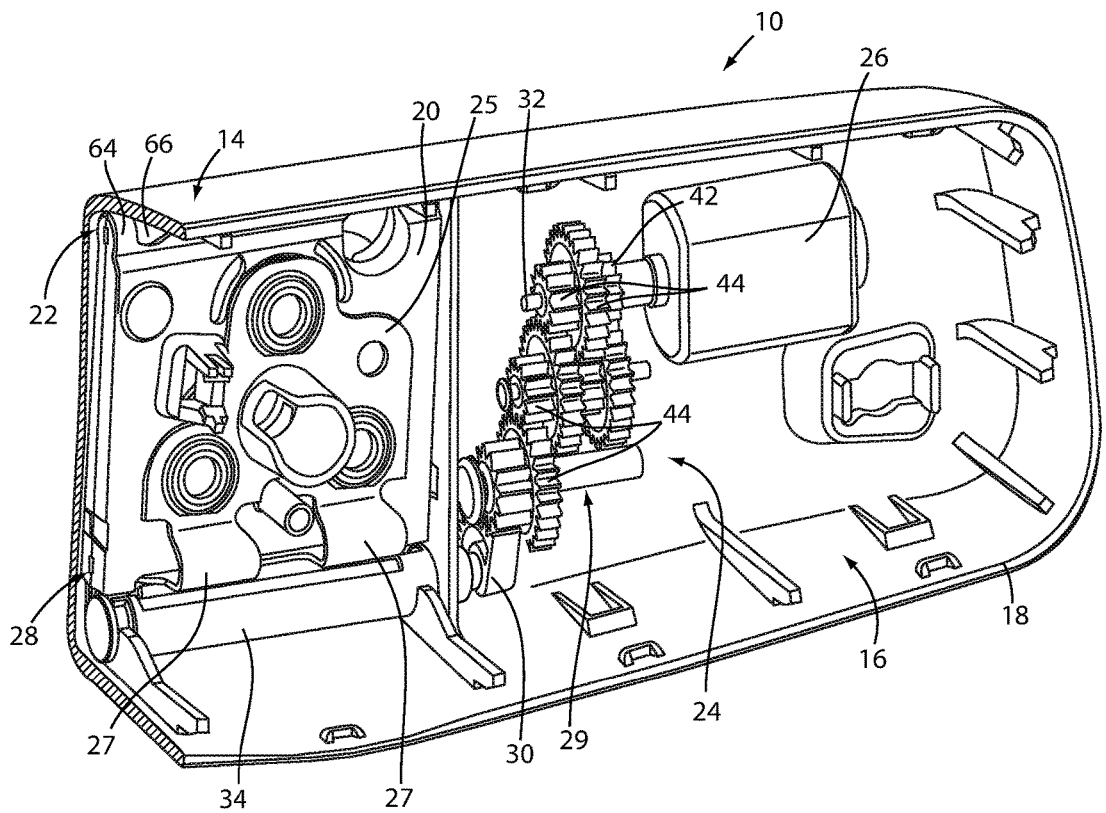
FIG. 4 is a front perspective cross-section view of a portion of the rearview mirror of FIG. 1 with the actuation mechanism in a configuration corresponding to an active position of the rearview mirror.

To facilitate such movement, the above-described internal components of rearview mirror 10, including spring plate 25, socket body 34, motor 26, and reduction mechanism 29 can move housing 14 by the above-described rotation of mounting plate 20 about first end 22 thereof. As shown in FIGS. 3 and 4, mounting plate 20 can couple with a mounting base 46 (FIG. 5) or other structure that can be a portion of or otherwise coupleable with the mounting structure 58, which is used to mount rearview mirror 10 within vehicle 12. Housing 14 may have an aperture 50 (FIG. 5) positioned adjacent mounting plate 20 such that mounting base 46 can pass therethrough, thus allowing mounting plate 20 to couple with mounting structure 58 to retain rearview mirror 10 in an adjustable position with respect to windshield 62 or headliner 60. Accordingly, the above-described relative movement of mounting plate 20 with respect to housing 14 causes movement of housing 14 (and accordingly substrate 52 coupled therewith) in the form of rotation thereof about first end 22 of mounting plate 20. Such movement, in turn, moves substrate 52 between the above-described active (FIG. 1) and inactive (FIG. 3) positions, according to whether or not display substrate 52 is in an off-state or an on-state. Such a mechanism can also obviate any need for a lever or other form of mechanical, manually operable feature, which may provide a more "high-end" or aesthetically pleasant form for rearview mirror 10.

As shown in FIG. 3, when display substrate 52 is inactive, rearview mirror 10 can be configured with actuation mechanism 24 and mounting plate 20 in the corresponding inactive position such that display substrate 52 can be manually moved to an appropriate position for use of reflective surface 54. Such movement can be done by a user or the like by movement of housing 14 about mounting structure 58, as further described below. Upon activation of the display substrate 52, rearview mirror 10 can cause housing 14 and display substrate 52 to tilt upward with respect to housing 14, thereby orienting reflective surface 54 toward headliner 60, as shown in FIG. 1. Such orientation can be achieved by rotation of mounting plate 20 with respect to housing 14 through an angle of about 6°, although such an angle can vary based on the location and structure of rearview mirror 10. Upon deactivation of display substrate 52, rearview mirror 10 can return display substrate 52 to the orientation shown in FIG. 3.

The movement of display substrate 52 (i.e. by overall movement of rearview mirror 10) can be achieved by rotation of socket body 34 by rotation of spur gear 30, driven by motor 26 via output gear 42 and reduction mechanism 29, to move mounting plate 20 with respect to housing 14 by the coupling of spring plate 25 between socket body 34 and mounting plate 20. Rotation of output gear 42 can be implemented automatically upon a change in the state (from active to inactive or vice versa) of display substrate 52. In an example, motor 26 can be automatically used to turn output gear 42 to cause movement of housing 14 and display substrate 52 from the active state (shown in FIG. 1) to the inactive state (shown in FIG. 3) upon a detected malfunction of display substrate 52 or powering down of vehicle 12. By the use of socket body 34 and spring plate 25 to move mounting plate 20 to achieve such positioning of substrate 52, housing 14 can be maintained in the selected position for off-state usage of rearview mirror 10 (without continued output from motor 26, as described further below), meaning that upon deactivation of display substrate 52, resulting in a return of substrate 52 to the position shown in FIG. 3, rearview mirror 10 may be in a generally acceptable position for inactive state usage thereof and may remain so until motor 26 is used to move mirror 10 back to the active state position.

As described above, movement of housing 14 and substrate 52 can be achieved by the above-described operable coupling of motor 26 with socket body 34 by engagement of reduction mechanism 29 with spur gear 30 and the operable coupling of spring arms 27 with socket body 34. In this arrangement, rotation of socket body 34 moves second end 28 of mounting plate 20 in a generally outward or inward direction with respect to housing 14, thereby causing rotation of housing 14 and substrate 52 about first end 22 of mounting plate 20 upward or downward about mounting structure 58 with which mounting plate 20 is generally fixed.

Returning now to FIG. 1, housing 14 is shown in the form of a single-piece structure that can be made to generally replicate the appearance of a standard rearview mirror and can further be made from a single piece of injection molded plastic or the like, although other materials are possible. In an example, substrate 52 can be coupled directly to housing 14 over open end 18. In an alternative example, substrate 52 can be coupled with a bezel or other secondary housing piece (not shown) that can, in turn, be coupled with housing 14. In either example, housing 14 is structured so that interior cavity 16 is of a sufficient depth to retain internal structures thereof, including motor 26, actuation mechanism 24, and other related structures, as well as control circuitry for display substrate 52. Housing 14 is also structured such that open side 18 is sufficiently large to accept substrate 52 therein in a manner that, again, can replicate the appearance of a typical rearview mirror.

Mounting plate 20, as described above, is rotatably coupled with housing 14 at first end 22 thereof. Such coupling can be achieved by the incorporation of a first hinge portion 64 into first end 22 of mounting plate 20 and a mating second hinge portion 66 into housing 14. Alternatively, a separate hinge (not shown) can be coupled between mounting plate 20 and housing 14. As further shown in FIG. 1, mounting plate 20 can generally extend through a majority of a vertical height of housing 14 and can, further, be of a width sufficient to stably support the entirety of mirror 10, such as by attachment of mounting base 46 to a side of mounting plate 20 opposite substrate 52 with a portion of mounting base 46 or mounting structure 58 passing through the appropriately-sized aperture 50 in housing 14.

Figure 5:
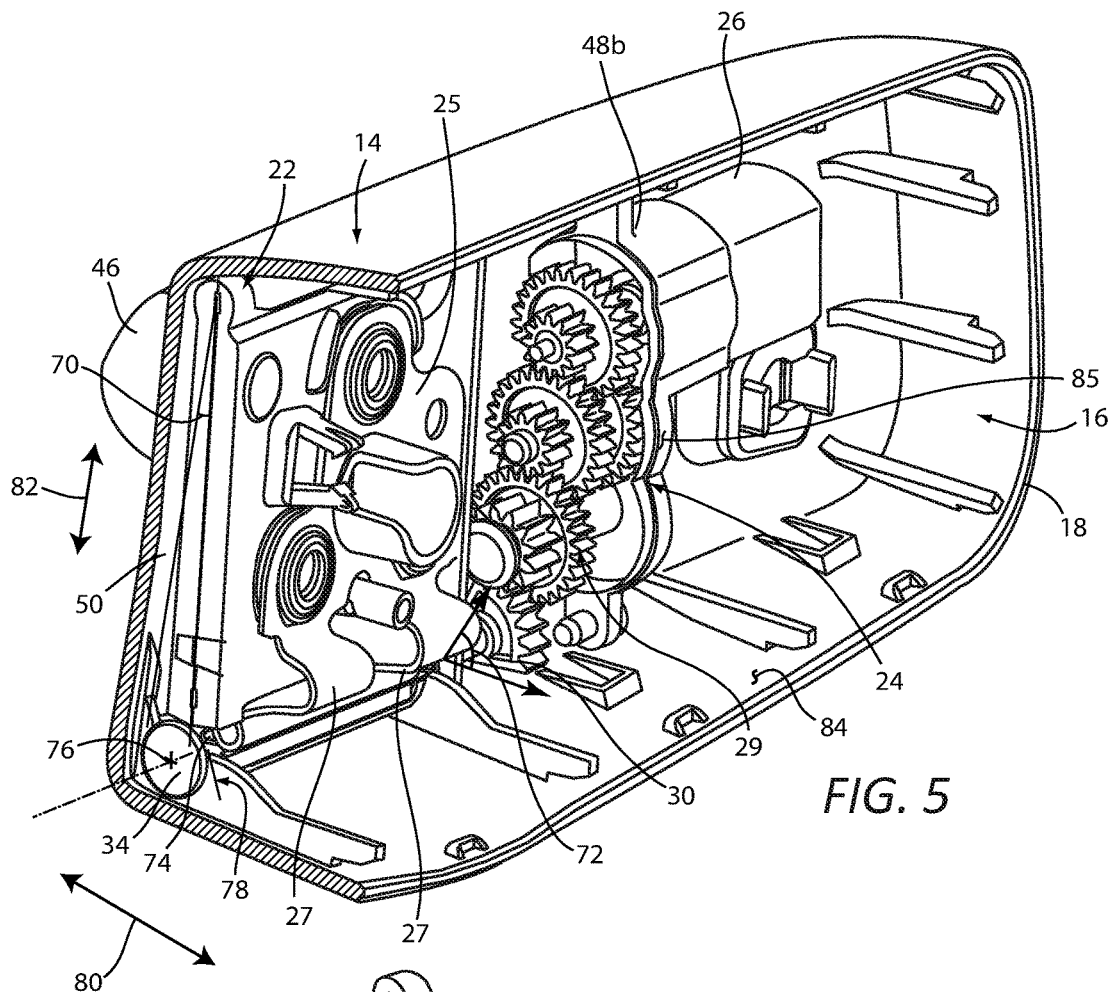
FIG. 5 is a front-perspective cross-section view of a portion of the rearview mirror of FIG. 1 with the actuation mechanism in a configuration corresponding to an inactive position of the rearview mirror.

Turning now to FIGS. 4 and 5, the movement of mounting plate 20 achieved by actuation mechanism 24 is illustrated in detail. In particular, the operable coupling of motor 26 with socket body 34 by the reduction mechanism 29 and spur gear 30 is such that motor 26 can rotate socket body 34 so as to apply a force on spring arms 27 to cause rotation of mounting plate 20 about first end 22. The amount of reduction provided by reduction mechanism 29, which is achieved by a series of reduction gears 44 contained within housing portions 48a and 48b, dictates the amount of movement of socket body 34 achieved by rotation of output shaft 32. This not only affects the speed of such movement but the torque applied to socket body 34 by motor 26.

In particular, it may be desirable to structure socket body 34, spring plate 25 (including spring arms 27), and mounting plate 20 such that, as discussed above, the operable coupling of spring arms 27 with socket body 34 provides two stable positions for socket body 34 that correspond to the active (FIG. 4) and passive (FIG. 5) positions for mounting plate 20, which are angularly spaced-apart from each other by angle 70 which may be between about 5° and about 10° (and in an embodiment about 6°). Further, such rotation of mounting plate 20 can be achieved through rotation of socket body 34 through an angle 72 of between about 70° and 100° and in one embodiment about 80°. As discussed previously, the coupling of spring arms 27 with socket body 34 can provide both for the desired rotation of mounting plate 20 and for the above-noted stable positions. In particular, spring arms 27 are coupled with socket body 34 by engagement thereof within slot 74 (which defines a coupling axis with spring arms 27), which is configured so as to receive spring arms 27 (such as by a cradling, snap, or press-fit arrangement) and to maintain a general position thereof that is offset from an axis 76, about which socket body 34 rotates, by a distance 78 of between, for example, 2 mm and 5 mm, and in an embodiment about 4 mm.

The offset arrangement of slot 74 with respect to axis 76 is such that slot 74 translates in the longitudinal horizontal direction 80 upon rotation of socket body 34 about axis 76. This translation causes movement of spring arms 27, which are coupled therewith, resulting in rotation of mounting plate 20 about first end 22. Spring arms 27 are of a resiliently deformable material, such as metal (e.g. spring steel, aluminum, or the like), for example, which may be the same as the entirety of spring plate 25 with which spring arms 27 may be integrally joined. The resilient deformability of spring arms 27 allows them to accommodate the component movement of slot 74 in the vertical direction 82 during the rotation thereof that results in the aforementioned longitudinal horizontal translation. Spring arms 27 can further be tuned to provide the above-noted stable positions for articulation mechanism 24 and, accordingly, rearview mirror 10. In particular, the resilient deformability of spring arms 27 may be such that spring arms 27 exert a spring force opposing the compression thereof that results from the vertical movement component of slot 74 during rotation of socket body 34 about axis 76, such spring force being sufficient to overcome the internal forces of mechanism 24 (e.g. friction between and among the various components thereof) and to urge socket body 34 into either of the positions thereof that are associated with the active position (as shown in FIG. 4) and the passive position (as shown in FIG. 5), upon slot 74 passing a vertical-most position (i.e. an apex) during rotation thereof. In other words, spring arms 27 can provide a generally vertically-downward force on slot 74 that urges rotation of socket body 34 when slot 74 is on either side of the vertical-most position during rotation thereof. Spring arms 27 can, further, be configured so as to be under compression when articulation mechanism 24 is in either stable position.

Various structures of articulation mechanism 24 can provide for physical limits to the movement of mounting plate 20 in both the active and passive stable positions. In one example, mounting plate 20 can contact an adjacent portion of housing 14 when in the passive position. In another example, spur gear 30 can be positioned such that opposite sides thereof contact corresponding portions of bottom wall 84 of housing 14 in, respectively, the active and passive positions. In an alternative arrangement, various physical stop structures can be incorporated on, for example, socket body 34 and housing 14 (see stops 286a and 286b in FIG. 8).

In an example, articulation mechanism 24, including spring arms 27 and socket body 34, can be configured such that a torque applied to socket body 34 of at least 200 N-mm is required to overcome the force of spring arms 27 and rotate socket body 34 about axis 76. It may be desired to use a motor 26 that can produce between about 5 N-mm and 20 N-mm of torque, for example, at output shaft 32. Accordingly, reduction mechanism 29, as shown in FIGS. 4 and 5, may be operably coupled between output gear 42 and spur gear 30 to allow motor 26 to drive rotation of socket body 34. In an example, reduction mechanism may include a plurality of inter-engaging reduction gears 44 to allow motor 26 to rotate output shaft 32 at a higher speed, with such speed reduced by gears 44 to produce a higher torque on spur gear 30. In an example, reduction mechanism 29 may have a total (or composite) ratio of between about 12:1 and about 20:1, and in one embodiment, about 16:1. Accordingly, motor 26 may rotate output shaft 32 at a speed of between about 110 and 300 revolutions per minute to affect rotation of spur gear 30 through a rotation of about 80° in two seconds or less, for example, at the appropriate torque needed to overcome the force of spring arms 27 and rotate socket body 34, thereby rotating mounting plate 20. Various arrangements can be employed for the reduction gears 44 within reduction mechanism 29, which may, for example, be selected based on the torque and speed requirements, as well as the available space within housing 14.

Figure 6:
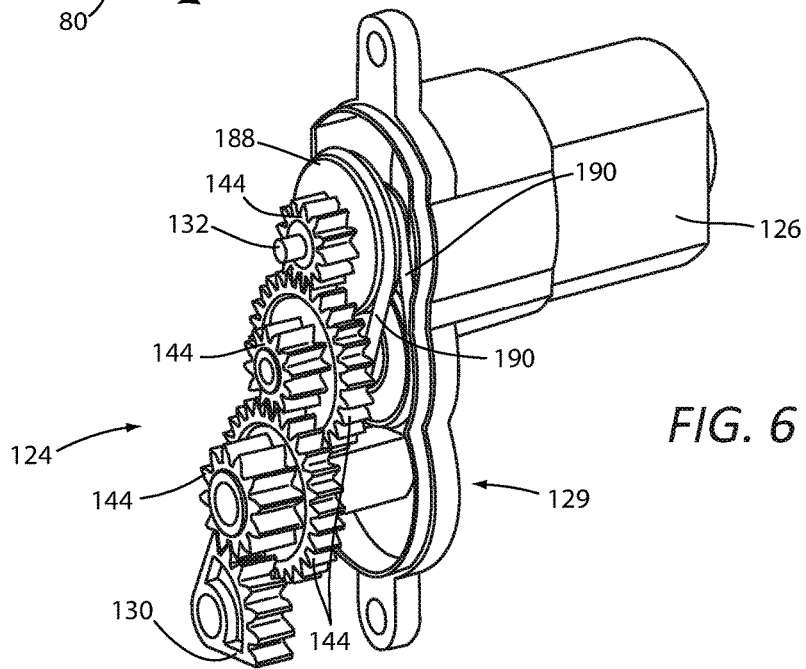
FIG. 6 is a front-perspective view of an alternative actuation mechanism that can be used in a variation of the rearview mirror of FIGS. 1-5.
Figure 7:
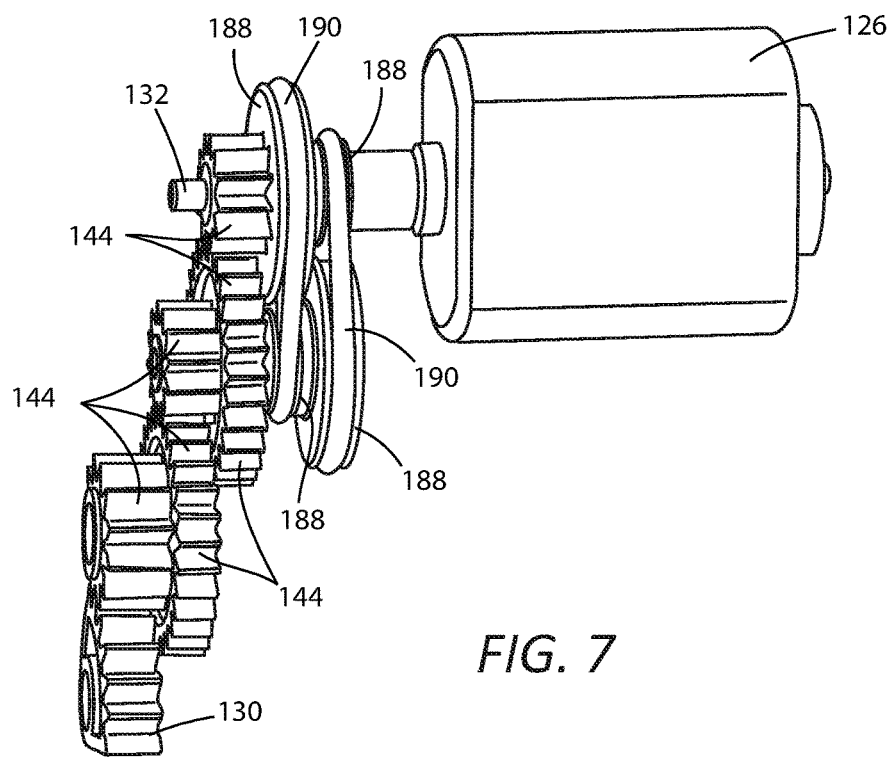
FIG. 7 is a front-perspective view of the actuation mechanism of FIG. 6 showing further internal components thereof.

Turning now to FIGS. 5 and 6, an alternative variation of reduction mechanism 129 is shown in which two pairs of pulleys 188, that are operably coupled with respective belts 190, replace some of the reduction gears (such as gears 44, as shown in FIGS. 4 and 5). Such an arrangement can provide generally the same level of reduction as a reduction mechanism 129 including gears 144 (such as that which is discussed above with respect to FIGS. 1-4), while lowering vibration and noise that may arise from the use of gears, with any gears closer to output shaft 132 of motor 126 being responsible for greater noise and vibration due to the higher speeds with which they rotate. Further, the use of belts 190 and pulleys 188 may allow for some slip within reduction mechanism 129, which may, for example, help prevent damage to gear teeth that may be subjected to high loads in such positions. The reduction mechanism 129 shown in FIGS. 5 and 6 may be used in place of mechanism 29 in the rearview mirror 10 shown in FIGS. 1-4.

Returning to FIGS. 4 and 5, the active position of mirror 10 can correspond to a positioning of mounting plate 20 in a generally parallel relationship to front wall 85. As discussed above, during movement of rearview mirror 10 out of the active position shown in FIGS. 1 and 4 and into the inactive position shown in FIGS. 3 and 5, motor 26 is used to implement rotation of the gears 44 within reduction mechanism 29 to drive rotation of spur gear 30, thereby causing rotation of socket body 34 and, further of mounting plate 20. As shown in FIGS. 4 and 5, rotation of spur gear 30 (and, accordingly, socket body 34) through an angle 72 of about 80° can correspond to rotation of mounting plate 20 through a corresponding angle 70 (FIG. 5) of, for example, about 6° to position mirror 10 in the inactive position, as shown in FIG. 5. The above-described reduction mechanism 29 can be such that rotation of output shaft 32 through about 3 revolutions and about 10 revolutions (and in one embodiment about 3.9 revolutions) can cause such rotation of spur gear 30.

Such rotation of output shaft 32 by motor 26 can be implemented by a controller 92 (FIG. 2) within mirror 10 or that is included in another control system of vehicle 12 (such as that associated with the above-mentioned rear vision system). Further, the rotation of output shaft 32 can be implemented based on a calculation of the rotation thereof using the characteristics of the motor and the current applied thereto or can be controlled based on information received from one or more sensors within motor 26 or elsewhere within mirror 10. When movement of mirror 10 from the inactive state to the active state (FIG. 4) is desired, rotation of output gear 4 can be driven by motor 26 opposite to the direction used to move mirror 10 from the active state to the inactive state.

In an embodiment motor 26 can be a 12 volt DC motor that can be configured to operate at 8 volts or more at 80° C. Further, motor 26 can be controlled to output shaft 32 through the above-described motion in a period of about 2 seconds or less. In an embodiment, a control circuitry for motor 26 can be configured to move mirror 10 to the inactive position, if necessary, upon a loss of power thereto, which can include an unexpected loss of power or upon the associated vehicle 12 being turned off.

Figure 8:
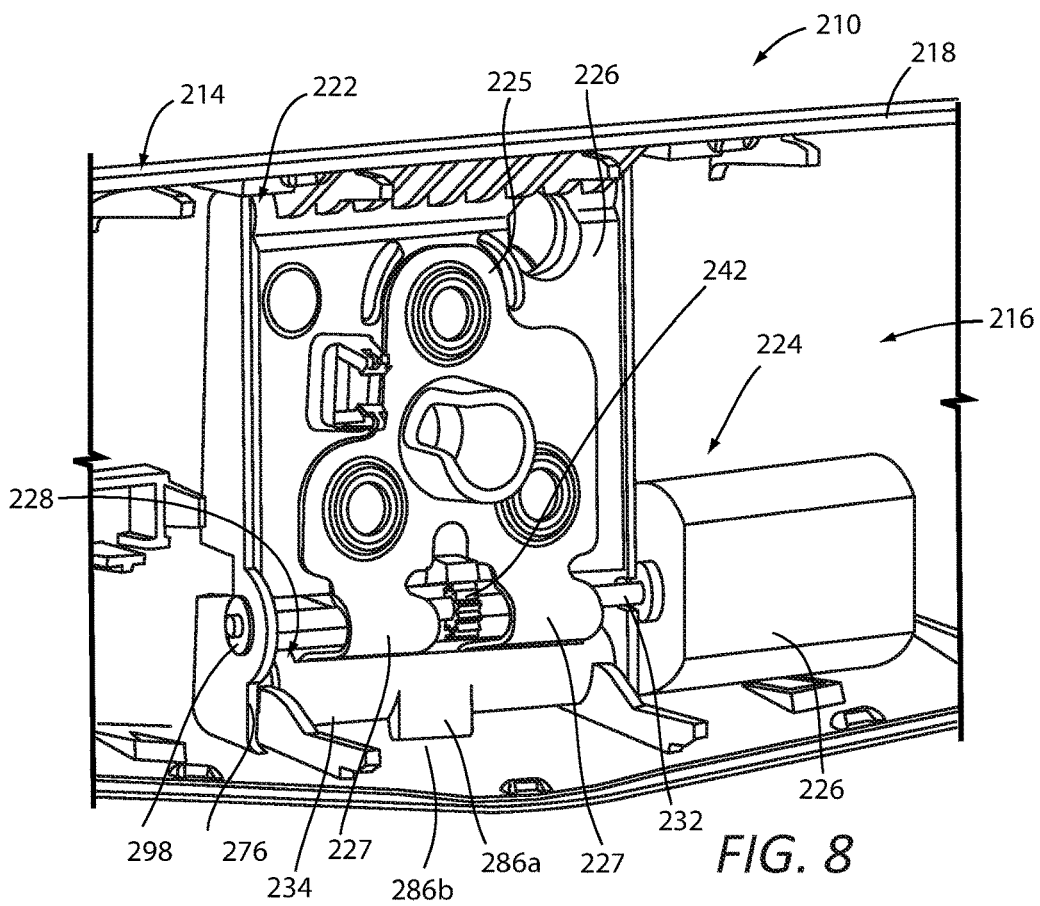
FIG. 8 is a front perspective view of a portion of an alternative rearview mirror including an actuation mechanism for tilting a display substrate included therewith.

As shown in FIG. 8, a variation of rearview mirror 210 can include a motor 226 coupled with a bearing shaft 232 that extends away therefrom in a direction generally parallel to axis 276 on which socket body 234 rotates. A drive gear 242 can be coupled on bearing shaft 232 that can be arranged to mesh with gear teeth included on socket body 234 to directly drive rotation thereof in a manner consistent with socket body 234 of articulation mechanism 224 described above with respect to FIGS. 1-5. Bearing shaft 232 may be supported opposite motor 226 by a bearing 298 coupled with housing 214. In such an example, the reduction achieved between drive gear 242 and socket body 234 may be close to 1:1 or, at most, about 2:1. Accordingly, motor 226 may be of a higher torque output than motor 26 described above, as needed to cause rotation of socket body 234.

Figure 9:
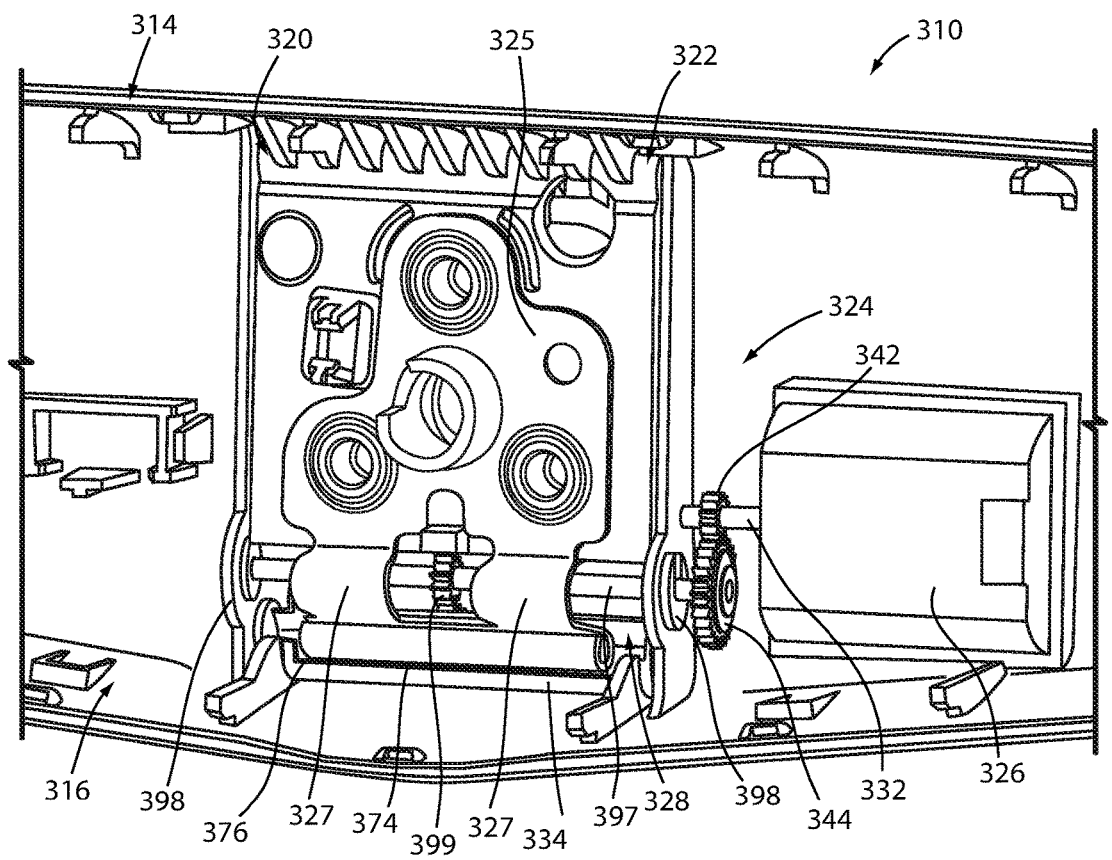
FIG. 9 is a front perspective view of a portion of a further alternative rearview mirror including an actuation mechanism for tilting a display substrate included therewith.

In another variation, shown in FIG. 9, an actuation mechanism 324 for a rearview mirror 310 can include a socket body 334 coupled with a mounting plate 320 by spring arms 327 of a spring plate 325 in a manner that is generally similar to the arrangement of mechanism 24 described above with respect to FIGS. 1-4, above. Actuation mechanism 324 can include a bearing shaft 397 extending generally parallel to axis 376 of socket body 334 and having coupled therewith a drive gear 399 that is operably engaged with teeth (not shown) on socket body 334. The bearing shaft 397 of actuation mechanism 324, however, is separate from output shaft 332 of motor 326 and is coupled therewith by a reduction gear 344 that is operably coupled with output gear 342 that is coupled with output shaft 332. Such an arrangement allows for additional reduction of the speed output of motor 326 to provide increased torque on socket body 334. As shown, bearing shaft 397 can be supported by a pair of opposite bearings 398 coupled with housing 314.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
   a substrate having a reflective surface thereon; and
   an actuation mechanism coupled with the substrate and including:
     a mounting plate defining a first end rotatably coupled with the substrate;
     a socket body rotatably mounted in a fixed position with respect to the substrate;
     a resiliently deformable arm coupled with and extending away from the mounting plate and operably coupled with the socket body along a coupling axis; and
     a motor coupled with the substrate and operably coupled with the socket body to drive rotation thereof.

2. The rearview mirror of claim 1, wherein the motor is operably coupled with the socket body by a reduction mechanism including at least one gear.

3. The rearview mirror of claim 2, wherein the reduction mechanism further includes at least one belt operably coupled between two pulleys.

4. The rearview mirror of claim 2, wherein the reduction mechanism has a reduction ratio from the motor to the socket body of between 12:1 and 20:1.

5. The rearview mirror of claim 1, wherein rotation of the socket body through a first angle with respect to the substrate causes rotation of the mounting plate with respect to the substrate about the first end between first and second stable positions.

6. The rearview mirror of claim 5, wherein:
   the first angle is between about 70 degrees and 100 degrees; and
   the stable positions are rotationally spaced about the first end of the mounting plate at an angle of between about 5 degrees and about 10 degrees.

7. The rearview mirror of claim 5, wherein:
   the rotation of the socket body through the first angle moves the a coupling axis from a first position at a first distance from the first end of the mounting plate to a second position at a second distance from the first end of the mounting plate and through an apex position at a third distance from the first end of the mounting plate that is less than the first and second distances; and
   the arm is biased against the socket body to urge the coupling axis away from the apex and toward a nearest of the first and second positions, the first and second positions corresponding to the first and second stable positions.

8. The rearview mirror of claim 1, further including a mounting arm coupled with the mounting plate, wherein:
   rotation of the output shaft of the motor drives rotation of the mounting plate with respect to the substrate, thereby causing the substrate to rotate with respect to the mounting arm.

9. The rearview mirror of claim 1, wherein the substrate includes a display, and wherein the reflective surface overlies the display.

10. A rear-vision system for a vehicle, comprising:
    a video camera mounted on the vehicle in a position to capture an image of a portion of an exterior thereof; and
    a display mirror, including:
      a substrate having a display in electronic communication with the camera for presenting the image thereon and a one-way reflective layer overlying the display; and
      an actuation mechanism coupled with the substrate and including:
        a mounting plate defining a first end rotatably coupled with the substrate;
        a socket body rotatably mounted in a fixed position with respect to the substrate;
        a resiliently deformable arm coupled with and extending away from the mounting plate and operably coupled with the socket body along a coupling axis; and
        a motor coupled with the substrate and operably coupled with the socket body to drive rotation thereof.

11. The system of claim 10, further comprising control circuitry coupled with the motor for controlling the motor in driving the rotation of the socket body, wherein:
    the control circuitry is further in electronic communication with the display and automatically causes the rotation of the socket body to move the substrate between first and second positions upon one of an activation or deactivation of the display, respectively.

12. The system of claim 11, wherein when in the first position, the substrate is angled toward a headliner of the vehicle by between 5 degrees and 10 degrees relative to the second position.

13. The system of claim 12, wherein the first and second positions of the s correspond with first and second stable positions of the actuation mechanism.

14. The system of claim 10, wherein the motor is operably coupled with the socket body by a reduction mechanism including at least one gear.

15. The system of claim 10, wherein the reduction mechanism further includes at least one belt operably coupled between two pulleys.

16. A vehicle, comprising:
    a windshield;
    a headliner adjacent an upper edge of the windshield; and
    a mirror assembly, comprising:
      a substrate including a display and a one-way reflective layer overlying the display;
      a mounting plate defining a first end rotatably coupled with the substrate;

a socket body rotatably mounted in a fixed position with respect to the substrate;

a resiliently deformable arm coupled with and extending away from the mounting plate and operably coupled with the socket body along a coupling axis; and a motor coupled with the substrate and operably coupled with the socket body to drive rotation thereof.

17. The vehicle of claim 16, wherein rotation of the socket body with respect to the substrate through a first angle causes rotation of the mounting plate about the first end between first and second stable positions.

18. The vehicle of claim 17, wherein when in the first stable position, the substrate is angled toward the headliner by between 5 degrees and 10 degrees relative to the second stable position.

19. The vehicle of claim 17, further comprising control circuitry coupled with the motor for controlling the motor in driving the rotation of the socket body, the control circuitry further being in electronic communication with the display and automatically causing the rotation of the socket body to move the mounting plate between the first and second stable positions upon one of an activation or deactivation of the display, respectively.

20. The vehicle of claim 16, wherein the motor is operably coupled with the socket body by a reduction mechanism including at least one gear.

\* \* \* \* \*